June 4, 1946.                    B. E. LUBOSHEZ                    2,401,688
                                  RANGE FINDER
                              Filed July 18, 1941                 8 Sheets-Sheet 1
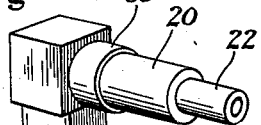
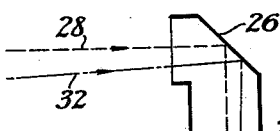
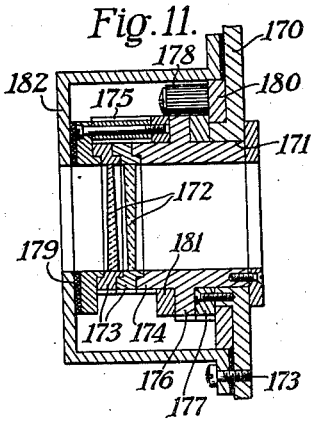
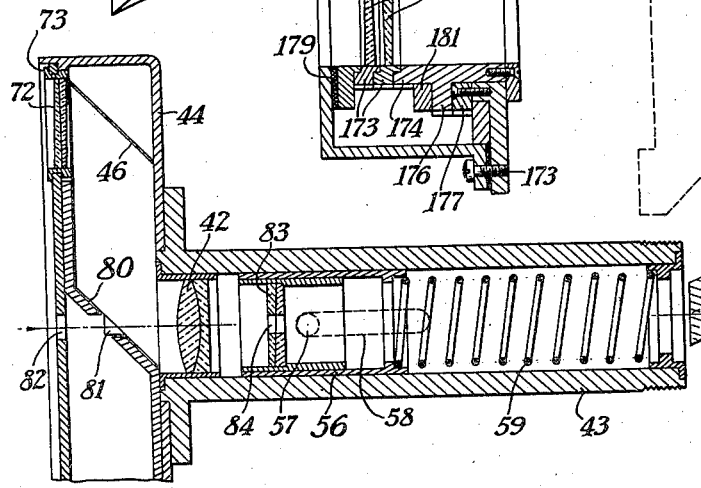
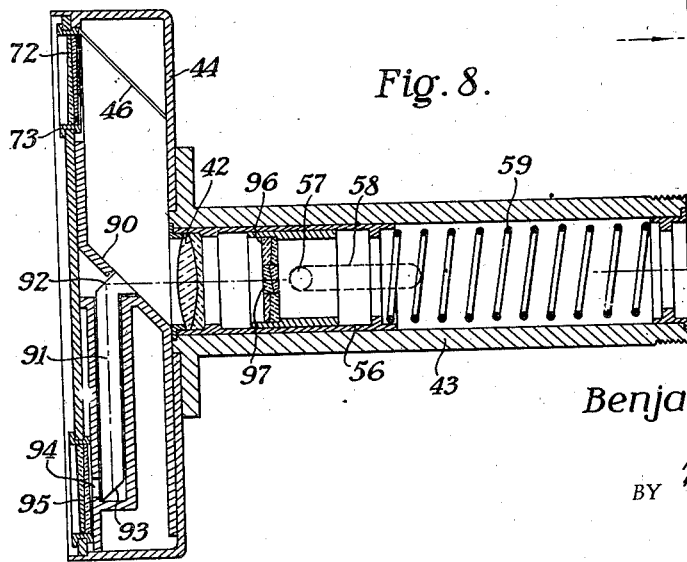
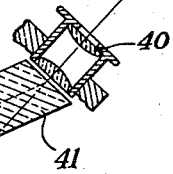
Benjamin E. Luboshez
INVENTOR
BY *Newton M. Perris*
ATTORNEY June 4, 1946.  B. E. LUBOSHEZ  2,401,688
RANGE FINDER
Filed July 18, 1941  8 Sheets-Sheet 2

Benjamin E. Luboshez
INVENTOR

BY
ATTORNEY

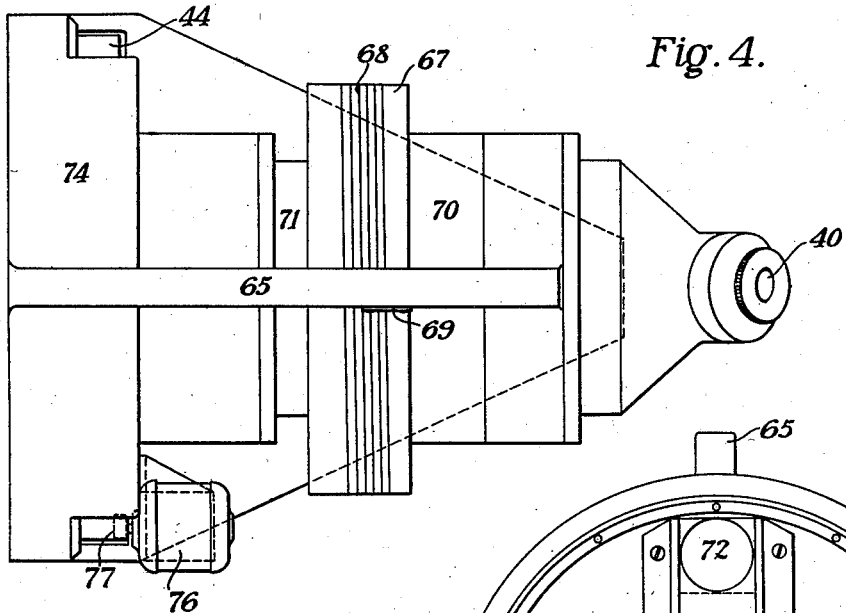
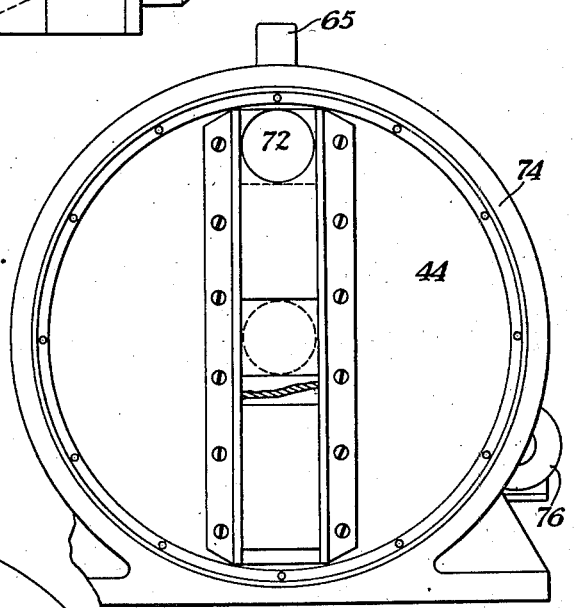
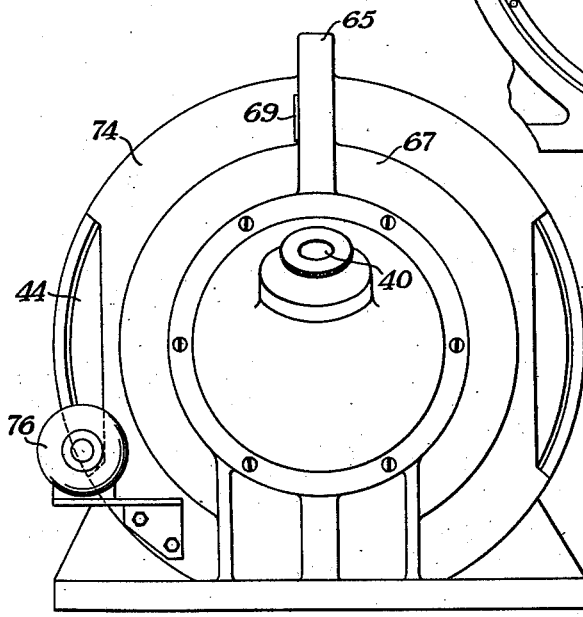
Benjamin E. Luboshez
INVENTOR

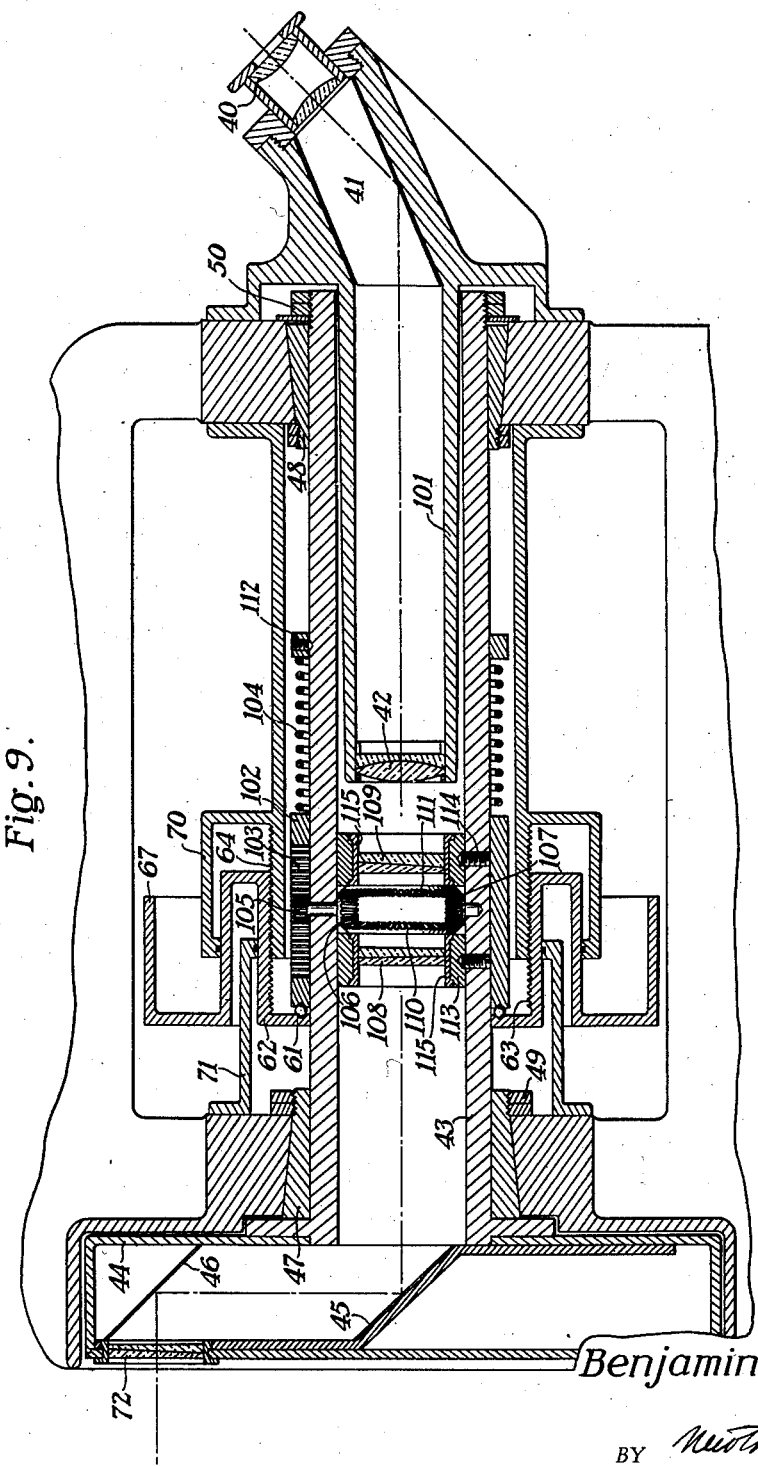

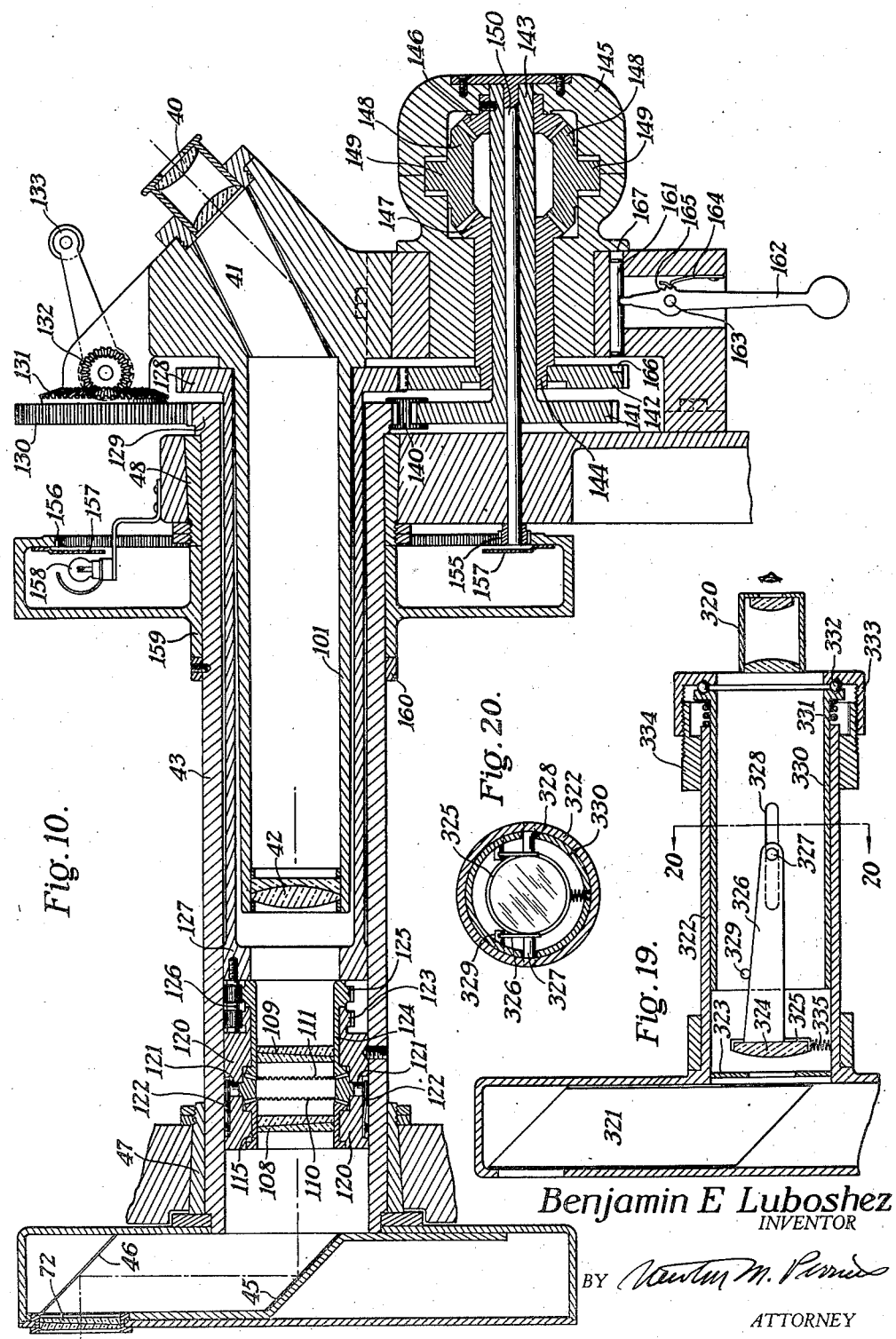

June 4, 1946.  B. E. LUBOSHEZ  2,401,688
RANGE FINDER
Filed July 18, 1941  8 Sheets-Sheet 6

Benjamin E. Luboshez
INVENTOR

BY *Newton M. Perrins*

ATTORNEY

June 4, 1946.  B. E. LUBOSHEZ  2,401,688
RANGE FINDER
Filed July 18, 1941   8 Sheets-Sheet 7

Benjamin E. Luboshez
INVENTOR

BY
ATTORNEY

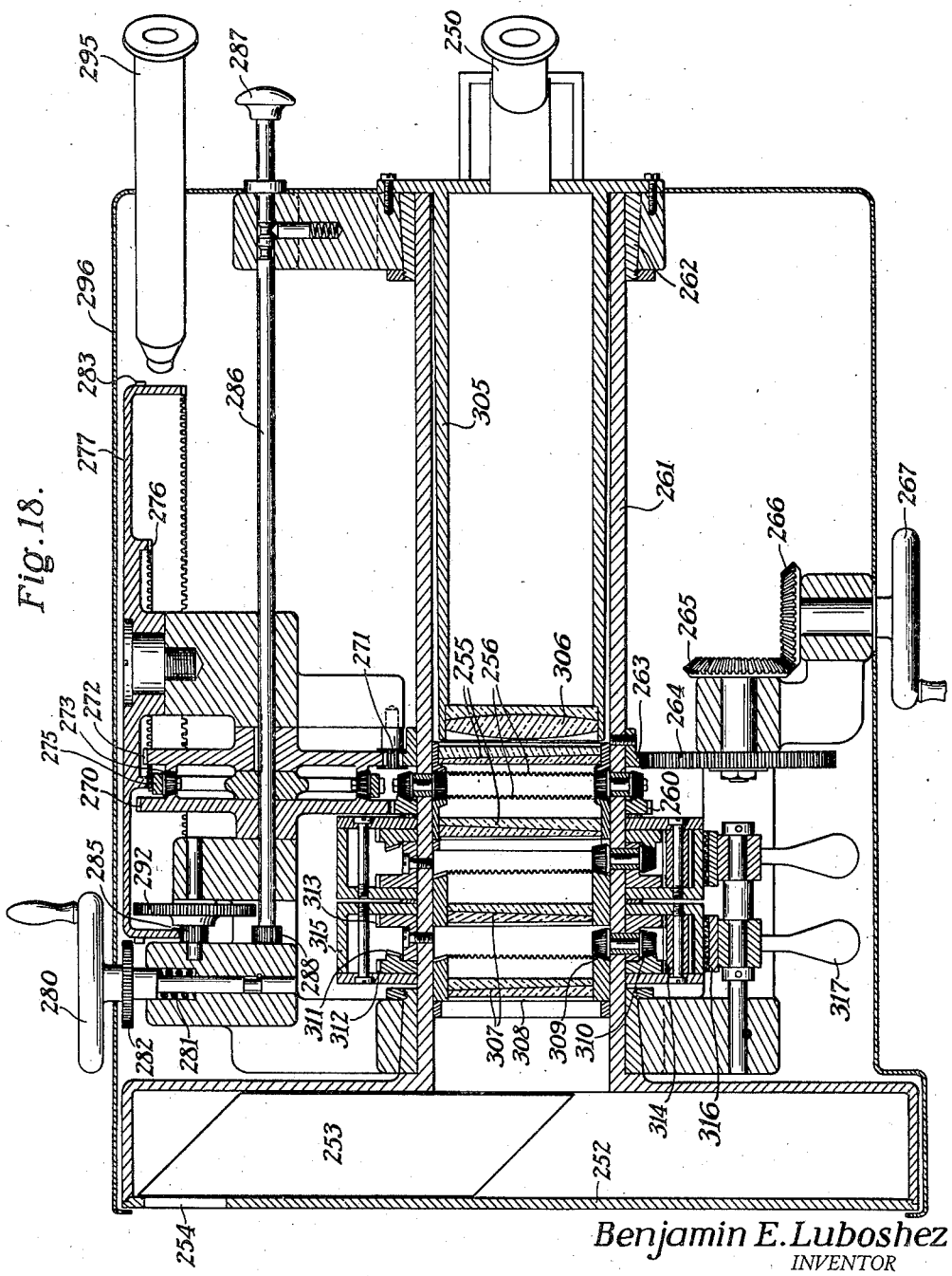

Patented June 4, 1946

2,401,688

UNITED STATES PATENT OFFICE 2,401,688

RANGE FINDER

Benjamin E. Luboshez, Rochester, N. Y., assignor to Eastman Kodak Company, Rochester, N. Y., a corporation of New Jersey Application July 18, 1941, Serial No. 402,982

31 Claims. (Cl. 88—2.7)

This invention relates to range finders.

Various forms of this invention are described in my copending application Serial Numbers 402,-983, 402,984, 402,985, and.402,986, all filed concurrently herewith.

It is the primary object of this invention to provide a method of range finding and a range finder which is more accurate than previous systems, which is independent of the observer's ability to judge stereo effects and which works equally well with sharp and diffused objects.

A review of prior range finding systems indicates that they can be divided into two general classes. The first of these, namely the coincident type may have various forms, for example, the overlapping image type whose accuracy is inferior to the other types, the split-field type, which is probably the most accurate of all but requires well-defined properly placed sharp lines in the target for maximum accuracy and thirdly, the unequal magnification type in which the whole instrument and both fields are moved simultaneously to bring coincidence. This latter type has little commercial significance, because of relatively poor accuracy. The second general class of range finders is known as stereoscopic. This type has graticules, one for each eye, stereoscopically positioned in the focus planes of the two eye-pieces, with either a large number of fixed marks with the corresponding range indicated adjacent to each mark, or with a wandering mark whose adjustment may be read against a suitable scale.

Thus the accuracy of all prior range finders depends in the limit upon one of two factors. Either the accuracy in which coincidence can be detected or the precision with which differences in depth in stereoscopic vision can be perceived.

The present invention, on the other hand, involves an entirely new principle and depends for its accuracy on the sensitivity of the eye to the perception of movement. It is well known that the eye is very quick to perceive that movement is taking place even if the moving object be very ill-defined. Thus the principle of the present invention does not have the inherent disadvantage of all coincident types for which well defined targets are so essential.

One interesting prior system attempted to get a stereo effect by having an obliquely oriented mirror rotating intermittently in front of a telescope and about the optic axis thereof. A series of radially located fixed mirrors provided a series of fixed but different viewpoints for the objective. Continuous motion was impossible since an optical sweeping of the fixed mirrors would be accompanied by image rotation and blurring. Thus there was no viewpoint motion along a path as in my preferred system nor was there any coupled mirror systems as employed in the various forms of my range finder.

According to the invention, there is provided a new method of range finding which consists in forming an image of the object whose range is to be found by means of an objective, then shifting the effective view point of the objective such as along a repetitive path relative to the focus plane of the objective. If an eye-piece is used, this focus plane is also the focus plane of the eye-piece. This shifting of the view point of the objective which may be accomplished in numerous ways described later, causes the image to shift similarly relative to the optic axis. If some means of arresting this motion of the image is provided, while continuing the shifting of the viewpoint, the range of the object is found by noting the adjustment of the image motion control device necessary to stop the image motion. For example, if the viewpoint of the objective is moved in a circular path, the corresponding circular motion of the image depends on the distance of the object from the range finder. Thus the adjustment to eliminate this motion is a measure of the range.

A range finder with which this method of range finding may be performed, consists of an objective for forming in its focus plane an image of the object whose range is to be found and some means for shifting the effective viewpoint of the objective while keeping the focus plane fixed. A device for controlling the movement of the image in the focus plane is coupled to whatever viewpoint shifting means is used and a scale is provided for indicating the range of the object when the control means is adjusted to the point at which the movement of the image is reduced to zero.

A preferred form of a moving viewpoint range finder according to the invention consists of a support which may be either a frame or a housing with an eye-piece carried on the support. A rotatable member is mounted on the front of the support, the term front not necessarily referring to any absolute orientation in space and the rotation being either complete in which case the member is a rotor or partial in which case the member is a pendulum. Two reflectors are carried by the rotatable member approximately parallel to one another and preferably rigid with respect to one another but either or both may be adjustable to alter the direction of reflection, i. e. of light deviation. The outer one of the two reflectors is carried near the rim of the rotatable member and receives light from the object whose range is to be found, either directly or via additional optical elements such as mirrors, prisms or lenses. It reflects this light inwardly toward the rotation axis either radially or at a slight angle.

The other of the two reflectors is an inner one positioned on the axis of rotation to receive the reflected light and in turn to reflect it along the rotation axis or more exactly approximately along this axis since the rays may be deviated slightly. An objective is carried either rigidly or rotatably in the path of the light and at the proper distance from the focus plane of the eyepiece to form therein an image of the object; the objective may be in front of the outer reflector, between the reflectors or behind the inner reflector. Some means for controlling the amount of image shift during rotation of the rotatable member is provided in the light path and is coupled to rotate with the rotatable member. This control means may be a tilting mirror, a tilting block of glass, a sliding prism, a tilting prism, two mutually rotating prisms, a sliding lens element, a tilting lens element, or other variable power wedge.

Furthermore additional wedge means are usually included in the light path for various reasons. With certain types of control means, zero deviation is available which corresponds to infinite range. Since it is never necessary to measure beyond infinity, a suitable stop is sometimes included to limit the range of the tilting mirror, tilting block or rotating wedges at this zero power position. On the other hand even with such control means it is usually preferable to employ their entire range, e. g. rotating prisms can be varied from maximum deviation in one direction to equal deviation in the opposite direction. In this case the additional wedge is used to compensate all of the deviation "beyond infinity." This means that the additional wedge must exactly cancel the control wedge when the latter is set to give the maximum deviation to the same side of the rotation axis as lies the outer reflector.

Of course if one is interested only in ranges less than some finite maximum distance, the end of the scale could be set for this finite range, but it is usually preferable to be able to check the instrument against infinity (the moon being a useful "infinite" object for this purpose).

Again the additional wedge may be made adjustable for presetting the scale—for example against the infinite object.

Furthermore the additional wedge may be set to compensate for any errors in the system such as an improperly tipped reflector. These latter errors may cause deviation to any side of the rotation axis and hence the direction of compensation is not limited to the one used when presetting the scale. The latter direction is in the plane of symmetry of the rotating member which plane is the one containing the rotation axis and the optic axis between the reflectors. The effective apex of the wedge system used for the control means is perpendicular to this plane of symmetry. The additional wedge means is not necessarily so oriented. The optic axis of the objective is also in this plane of symmetry even when deflected by the rotating reflectors, but after it strikes the image plane or even in front of this, the optic axis may be reflected to the eyepiece at any convenient angle.

The rotation axis coincides with a portion of the optic axis, but in certain embodiments of the invention such as where the objective shifts this coincidence is only approximate. Theoretically the only absolute requirement is that when the instrument is set for infinity, the optic axis as it strikes the image plane coincide with the rotation axis at this point whether either or both have been reflected or otherwise deviated. The simplest embodiments of the invention have the rotation axis in approximate coincidence with a large portion of the optic axis.

Specific forms of this new type of range finder are described in the following description which corresponds to the accompanying drawings in which:

Fig. 1 illustrates the principle of the invention.

Fig. 1A shows the field of view through the instrument.

Figs. 2, 3, 4, 5, and 6 are respectively a side elevation, a side elevation in cross section, a top view, a front view and a rear view of one embodiment of the invention.

Fig. 7 shows a side elevation in cross section of part of a slightly different embodiment of the invention.

Fig. 8 similarly shows another embodiment of the invention.

Fig. 9 similarly shows still a different embodiment of the invention.

Fig. 10 shows another embodiment of the invention.

Fig. 11 shows a simple adjustable wedge.

Fig. 12 shows a pentagon prism.

Fig. 13 shows a pendulum type embodiment of the invention.

Figure 14:
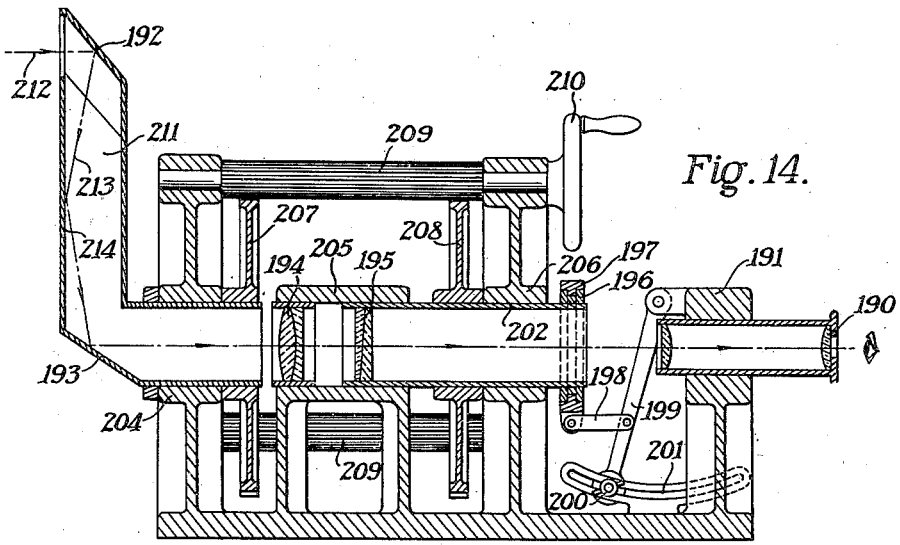

Fig. 14 shows a simplified embodiment of the invention.

Figure 15:
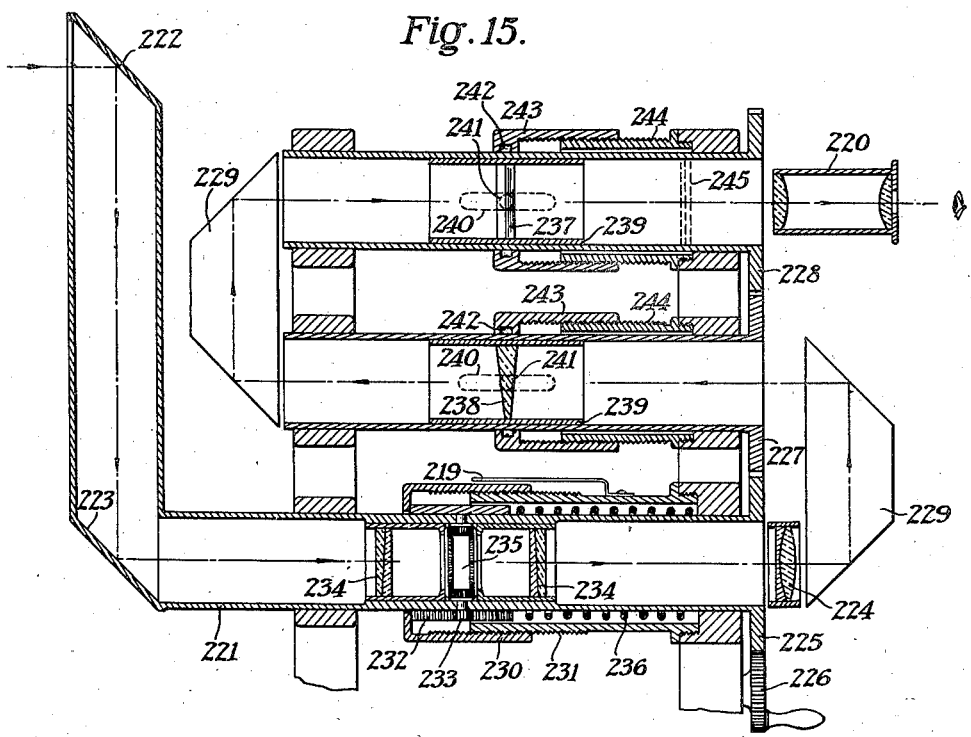

Fig. 15 shows a compact embodiment of the invention.

Figure 16:
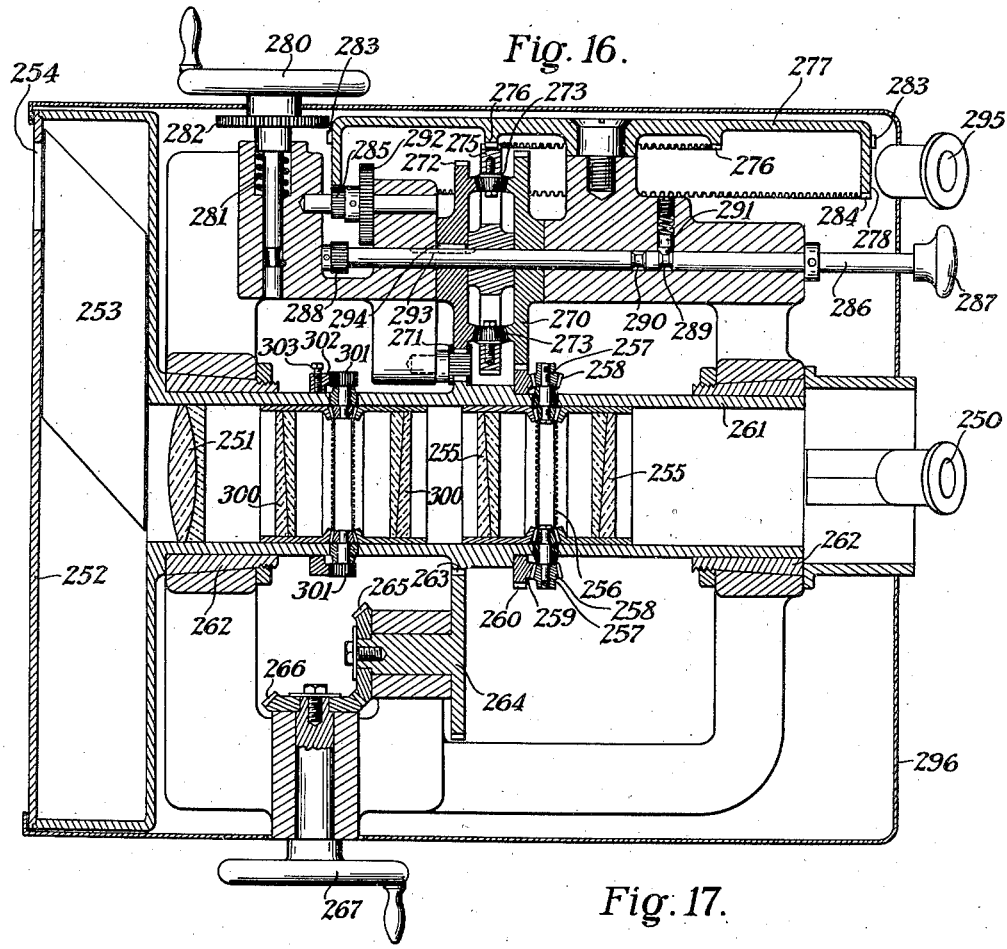

Fig. 16 shows an embodiment of the invention which is convenient to operate.

Figure 17:
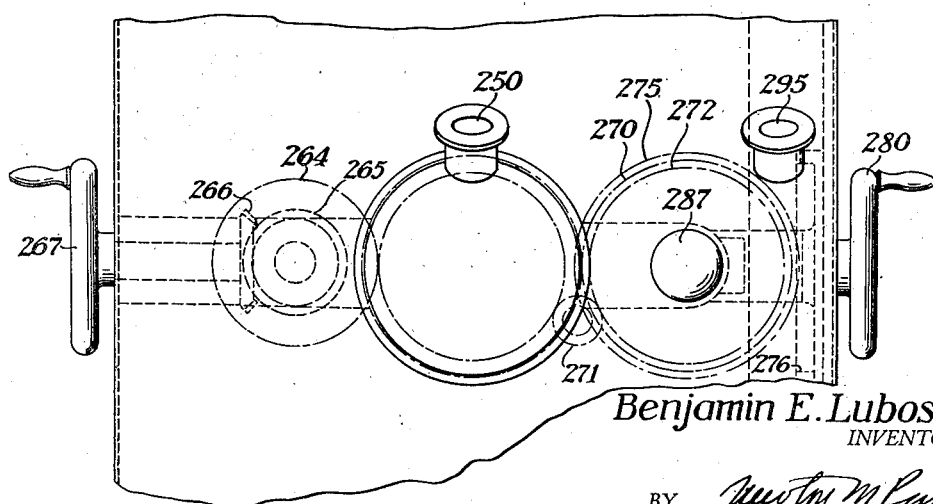

Fig. 17 shows a rear view of the embodiment shown in Fig. 16.

Fig. 18 shows a variation of the embodiment shown in Figs. 16 and 17.

Figs. 19 and 20 show an embodiment wherein a single unit serves both as the objective and the light deviating means.

In Fig. 1 there is shown a telescope having a housing 20, a fixed objective 21, and an eye-piece 22 transmitting light to the eye 24 of the observer. The focus plane 23 may be considered the focus plane either of the objective 21 or of the eye-piece 22. Mounted on this telescope 20 is a rotating arm 25 which may be carried by a rotor or simply act as a pendulum. This rotating arm 25 includes an outer reflector 26 and an inner reflector 27 by means of which light from the object whose range is to be found is transmitted to the objective 21. It is not absolutely necessary that the objective 21 be carried directly in front of the eye-piece 22, since it might conveniently be placed anywhere in the system such as in the rotating arm 25 between the reflectors 26 and 27 or even in front of the reflector 26.

For explanation of the theory of the invention, only points on the optic axis of the system, which is the axis of rotation 31 of the rotating arm 25, are considered. It will be noted that objects at infinite distance are brought to focus as indicated by rays 28 and 29 at a point 30 on the optic axis. On the other hand objects at nearer range as indicated by the rays 32 and 33 are brought to focus at a point 34 which rotates around the axis as the rotating arm 35 is rotated.

Objects which are not on the optic axis are similarly brought to focus in the field of view, a complete inverted image being formed as in any telescope. Objects at infinite distance form images which are held stationary and those at near-by range form images which shift with a circular motion relative to the optic axis. That is, the image of any particular object remains inverted but moves with a circular motion unless the object is at infinity.

If, in this Fig. 1, one were to provide a light deviating means to bring the point 34 down to the optic axis (the point 30 being moved correspondingly to one side), the image of the object emitting the ray 32 would not shift as the rotating arm 25 is operated. The object at infinity would give a shifting image however when the image motion eliminator is so adjusted.

This light deviating means, or more generally, this image motion eliminator or control means may consist of a simple arrangement for tipping either the mirror 26 or the mirror 27. Similarly it may consist of a sliding wedge, two rotating wedges, a laterally sliding lens, a variable power wedge made up of adjacent plano concave and convex plano lenses, one of which is movable, or even a sphero-plano element as described by Ort in U. S. Patent 2,191,027 or any of the other known variable power light deviating devices. The basis of the present invention lies in the use of an objective having a shifting viewpoint rather than in the particular kind of light deviating device employed to stop the image motion. However the preferred forms of light deviating devices are described in detail in connection with other figures.

If a light deviating device is selected whose power ranges from zero to some finite value, the zero setting corresponds to infinity range in Fig. 1. If the light deviating device has finite power for both of its extreme values, it is advisable (even when one of the intermediate values is zero) to insert a compensating wedge or a limiting stop so that one of the limits in the setting of the device corresponds to infinity.

In Fig. 1A is shown the field of view when ranging a subject, a flag being selected as the example. In the general embodiment of the invention, the image 36 rotates without changing its orientation until the instrument is adjusted to eliminate this motion. If a fixed image such as shown by broken lines 37 is superpositioned on the field, as, for example, in the embodiment described in connection with Fig. 7, the image 36 rotates about this fixed image 37.

Figs. 2 to 6 relate to the same embodiment of the invention and will be described simultaneously. In this embodiment an eye-piece 40 is positioned behind an erecting roof prism 41 for convenient viewing of the image formed in the focus plane of an objective 42. The objective is carried by a rotating member consisting of a tube 43 and a rotor housing 44 in which is located a prism having reflecting surfaces 45 and 46 to receive light from the object. Obviously, as the rotor is rotating, the viewpoint of the objective 42 is effectively shifted and in the focus plane of the objective, all images shift circularly except those of an object at some predetermined distance from the instrument.

The whole rotating member is carried in bearings 47 and 48 and is securely mounted therein by suitable nuts and washers 49 and 50. The rotating arm or rotor in any of the embodiments may be hinged or detachable for convenient transport of the instrument. Also the periscopic prism may be built of several similar units in cascade.

In order to ascertain the range of an object, the rotor 44 is rotated either by hand at a conveniently cut-away portion in the side of the housing 74 or by a friction drive motor 76 mounted adjacent to one of these cut-away portions. A wedge 55, preferably achromatic, is provided slidably carried by a sleeve 56 in the tube 43. A pin 57 carried rigidly by this sleeve 56 extends through a slot 58 in the tube 43 and is fastened to a sliding collar 60. This collar 60 and sleeve 56 may be moved longitudinally on the tube 43 and are pushed forward by a spring 59 against a ball-bearing 61 which is held in place by a control member 62. The control member 62 does not rotate with the tube 43, whereas the collar 60 does. This control member 62 is carried on the frame 65 of the range finder and is adjustable thereon by means of screw threads 63 and 64. Rotation of the drum 67 carries this control member 62 with it and moves a spiral scale 68 past an index 69 by means of which the distance of the object may be read off directly. Suitable dust covers 70 and 71 are provided for the adjustable control member.

In order to make a zero adjustment or, more correctly, an infinity adjustment of the scale 68, an adjustable wedge 72 mounted in collar 73 is provided on the front of the rotor 44. One form of said adjustable wedge is shown in detail in Fig. 11. If the reflecting surfaces 45 and 46 are absolutely parallel to one another the instrument is at "infinity" adjustment when the wedge 55 has no power or more exactly when the wedge 55 is exactly compensated by the wedge 72. Since it is useless to be able to measure objects "beyond infinity," the instrument is arranged so that one end of the scale reads infinity and the effect of the wedge 72 is exactly equal to and opposite to that of the wedge 55 when this wedge 55 is in the "infinity" position as indicated by the scale. For convenience in carrying, the frame 65 is provided with a handle in the form of a cut-away portion 66.

For maximum sensitivity the focal length of the objective 42 should be as long as possible; also this objective should be as near the front window of the system (wedge 72 in this case) as possible to provide wide coverage. On the other hand the image shift is quite sensitive to lens wobble and hence a preferable embodiment described below has the objective supported independently of the rotor. In place of the compensating wedge being as shown at 72, any form of variable wedge may be used; in certain embodiments the compensating wedge is arranged to be adjustable while the rotor is being rotated to permit presetting the scale means by checking on an object at a known distance. Whereas the control wedge need only deviate light in a direction parallel to the plane containing the optic axis between the reflectors and the axis of rotation, the compensating wedge may be required to act in any plane through the axis of rotation and hence should be either rotatable or made up of two variable wedges at right angles to compensate separately for each component of the "infinity" error.

Figure 2:
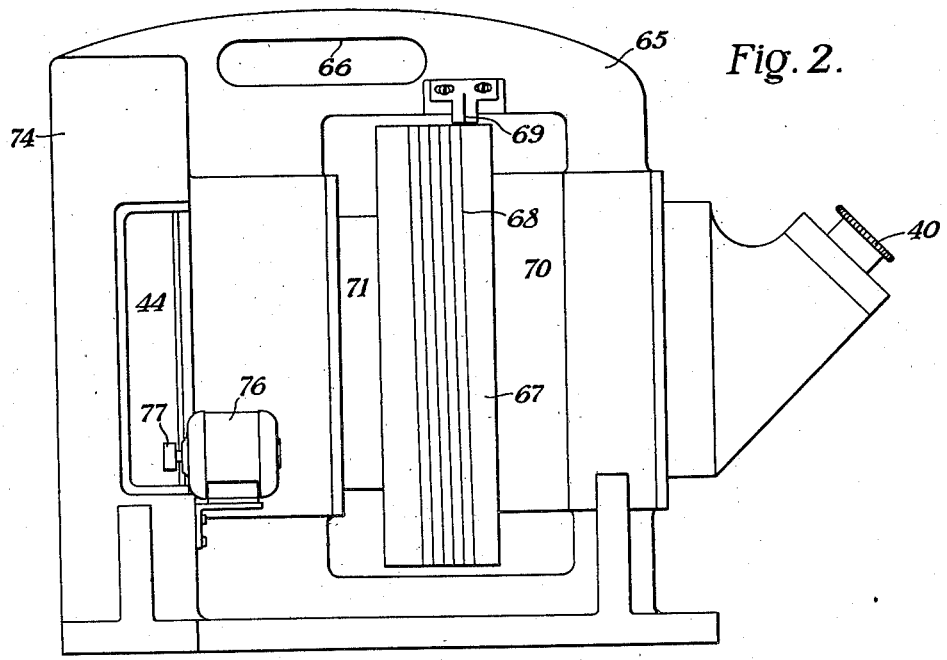
Figure 3:
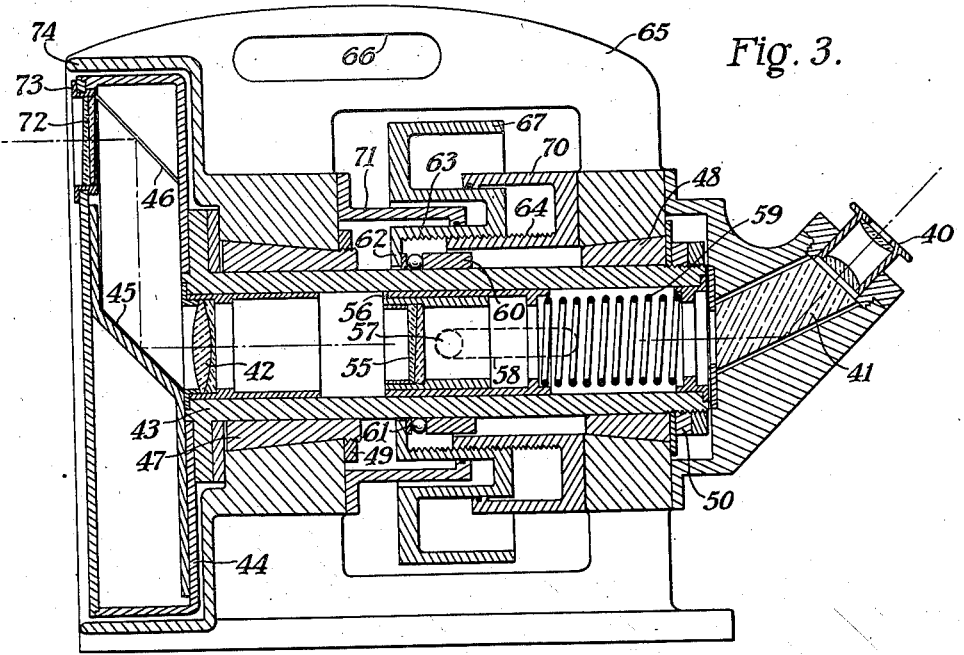

Figs. 7 and 8 show alternative forms of the rotating member and are intended to be compared with Fig. 3. The frame work, bearings, etc., are not shown in these Figs. 7 and 8.

Fig. 7 differs from Fig. 3 by having the reflecting surface 45 of Fig. 3 replaced by a surface 80 having an aperture therein through which the object may be viewed directly. To provide this aperture on the single prism member containing the reflection surfaces 80 and 46, a small prism 81, or more exactly a section 81 of a cylinder is cemented to the axial region of the reflecting surface 80. Light from the object passes through an aperture 82 in the front of the rotor 44 and through an aperture 84 in the prism 83 which replaces the wedge 55. In this embodiment, it is particularly necessary to have the wedge as near as possible to the reflecting surface 80. In fact, it may be preferable to use the rotating type of wedge described in connection with Fig. 9 and an objective behind the wedge, since in this case, the distance between the reflector and the wedge is small and does not change. However, for purposes of illustration the simple sliding wedge 83 is shown in Fig. 7. The other elements correspond, as numbered, to Fig. 3.

Similarly in Fig. 8, an inner reflecting surface 90 is provided the center portion of which is cemented to an additional prism 91 having reflecting surfaces 92 and 93 for viewing the object through an aperture 94 in the rotor and through an additional adjustable wedge 95 carried by the rotor. Light passing through this axial portion of the system is controlled by a control portion 97 of the adjustable wedge 96 which is reversed relative to the rest of the wedge. Figs. 7 and 8 provide combinations of the present invention with the coincident type range finder as particularly described in my copending application, Serial No. 402,986, filed concurrently herewith. Aside from the utility for coincidence type range finding, the additional image serves as a reference plane for easier perception of movement.

In Fig. 9, there is shown another form of light deviating means and a different arrangement for holding the objective 42. In this case the objective 42 is carried rigidly by a fixed sleeve 101. Such an arrangement is preferable since tolerances for any motion of the objective are much smaller and more critical than for the other parts of the rotor and hence it is more important to hold this element rigid than to hold the rotor in proper alignment, although the latter is important. In this figure, the collar 60 of Fig. 3 is replaced by collar 102 carrying a rack 103 and held in place by a spring 104 which presses against a collar 112 fixed to the rotating tube 43. As the collar 102 is moved longitudinally by means of the control member 62 and the ball-bearing 61, the rack 103 causes the pinion 105 to rotate and hence the bevel gear 106 to rotate which in turn rotates the ring bevel gears 110 and 111. For accuracy an additional bevel gear 107 is provided opposite to the small drive gear 106. Rotating sleeves 115, and the ring bevel gears 110 and 111 carry wedges 108 and 109 which rotate equal amounts in opposite directions forming a rotating wedge type of light deviating means with the effective apex of the combination always perpendicular to the plane through the axis of rotation and the optic axis between the reflectors (i. e. the plane of the paper in the drawing). The rotating sleeves 115 are carried by suitable receptacles 113 rigidly fastened to the tube 43 by studs 114.

As the wedges 108 and 109 are rotated in opposite directions, they pass from a point in which they deviate the light a maximum amount in one direction to a point at which they deviate the light the maximum amount in the other direction. As before, infinity is arranged at one end of the scale and a compensating wedge such as the wedge 72 is provided somewhere in the system to give zero deviation for "infinity" setting. Of course, the compensating wedge may have any of the forms discussed above in connection with the light deviating means, such as adjustable reflectors in place of the reflectors 45 and 46 or sliding lenses, etc. Similarly the light deviating means may be anywhere in the system, the one shown being simple and convenient.

Fig. 10 utilizes the same form of light deviating means as shown in Fig. 9, but the operation of this control device is by means of an inner sleeve rather than an outer sleeve. In Fig. 10 the rotating wedges 108 and 109 with their bevel gears 110 and 111 are carried by a bevel gear set made up of the bevel ring gears 110 and 111 and bevel pinions 121 supported by spring members 122 in a suitable sleeve 120. As before, the wedge 108 is carried by a rotating sleeve 115, but the wedge 109 in this case is carried by a sleeve 124 having a gear 125 thereon. As long as the sleeve 124 and the holding sleeve 120 rotate together, there will be no relative rotation of the wedges 108 and 109 and since the holder 120 is carried rigidly by the tube 43, there will be no variation in light deviating power. However, the holder 120 is provided with a gear 123 having one tooth less (or one tooth more) than the gear 125 on the sleeve 124. A pinion 126 engages both the gear 123 and the gear 125 and is carried by an inner tube 127 in the tube 43. As the tube 127 is rotated, in the manner to be described below, relative to the tube 43, the pinion 126 moves around the two gears 123 and 125 moving them relative to one another, one tooth for each complete circuit of the pinion 126. This provides the relative rotation of the sleeve 124 and the holder 120 and through the gears 121 provides an equal relative rotation of the sleeve 115 in the opposite direction.

While the rotor and tube 43 are rotating, the tube 127 rotates therewith, except when some adjustment is required. A suitable driving mechanism for the tube 43 is provided by a spur gear 129 engaging another spur gear 130 but which is integral with a bevel gear 131 driven by a bevel gear 132 mounted on a crank 133. The driving mechanism may be at the side but is shown on top of the instrument for clarity in the drawing. The inner tube 127 is similarly provided with a spur gear 128.

Through an idler 140, the gear 129 drives a spur gear 141 and a tubular shaft 143. The gear 128 similarly drives a spur gear 142 and its tubular shaft 144 directly. Due to the idler 140, these gears 141 and 142 rotate in opposite directions. The shafts are fastened respectively to bevel gears 146 and 147 which form parts of a differential gear and engage bevel gears 148 carried on short axles 149.

These axles 149 are supported in a knob 145 which acts as the control means for the light deviating device. As long as this knob is not rotated, the gears 146 and 147 rotate in opposite directions with equal speeds and hence due to the proper number of teeth being provided, the gears 128 and 129 rotate with the same speed in the same direction and there is no relative movement of the wedges 108 and 109. However, when the knob 145 is rotated, there is a differential drive on the gears 146 and 147 providing a retarding of one relative to the other and hence a change in speed of the rate of rotation of the gears 128 and 129. As described in detail above this provides the necessary adjustment of the wedges 108 and 109.

Through a spindle 150 and a spur pinion 155, the rotation of the knob 145 adjusts a suitable scale 157 carried on a drum having an internal gear 156 engaging the spur pinion 155. This drum is supported for free rotation by a tubular hub 159 on the tube 43 and is held in place against the bearing 48 by a retaining ring 160. For convenience the scale 157 is mounted on translucent material and is backlighted by a lamp 158.

After a setting has been made, further rotation of the knob 145 may be prevented by pressing a latch bolt 161 into frictional contact with the surface 167 of the knob 145. To do this the lever 162 pivoted at the point 163 is rotated and held in place by a spring 164 engaging notches 185 in the lever.

However, this is not the main purpose of the latch bolt 161 and lever 162. The main function of this latch is utilized when the lever is pushed in the other direction so that the latch bolt 161 engages a recess 166 in the gear 142. This locks the gear 142 against further rotation so that turning the crank 133 must act to rotate the tube 43 relative to the now rigid inner tube 127. Incidentally, through the differential gear system in the knob 145, this knob rotates at the same time. For every rotation of the tube 43 relative to the inner tube 127, the gear 123 is advanced one notch relative to the gear 125 which means there is a slight rotation of the wedges 108 and 109 relative to one another. Therefore, as the crank 133 is rotated, the instrument is in continuous adjustment and passes in cycles through the point of proper adjustment at which point the reading on the scale may be read off.

With this cyclic adjustment of the instrument, the scale 157 should read from infinity at one point to the near point at the opposite side of the scale and back to infinity so that the scale is continuous and corresponds to the adjustment of the two wedges 108 and 109 continuously in opposite directions. That is, the scale is completely circular with the infinity point and the near point at opposite ends of a diameter about which diameter the sides of the scale are symmetrical. With the scale conveniently arranged so that it may be viewed with one eye while the other eye watches the motion of the image in the eye-piece, this cyclic arrangement for continuous adjustment is particularly useful since several readings may be taken rapidly and chances for error thereby minimized. If desired the final critical adjustment may be made directly with the automatic feature out of connection.

Fig. 11 shows a conveniently adjustable compensating wedge useful on any kind of range finder or other instrument and particularly useful as wedge 72 shown in Figs. 3 to 10. A face plate or support 170 is provided with a circular aperture or window 171. Into this aperture fits a tube which is free to rotate and which has two ring gears 174 and 176. Two wedges 172 fit onto the end of this tube and have as their mounts, ring gears 173, one of which has one tooth more and the other one tooth less than the gear 174. A pinion 175 carried by a freely rotating collar 181 engages all three gears 173 and 174. As this pinion 175 is turned by the finger rotating it around the gear 174, the gears 173 turn slowly in opposite directions adjusting the power of the two wedge combination altering the direction of its effective apex only very slightly.

Similarly a ring gear 177 having one tooth more or less than the gear 176 is rigidly attached to the face plate 170. A pinion 178 carried by a freely rotating collar 180 engages the gears 176 and 177 rotating the gear 176 slowly as it (178) is rolled around the gear 177. This rotates both wedges together and adjusts the direction of the apex of the two wedge combination.

After the adjustments are thus made, a cover plate 182 is clamped on by screws 183 and by means of a rubber gasket 179, the parts are clamped in place.

As is well known in range finder practice, the reflecting surfaces may be replaced by pentagon prisms such as 180 shown in Fig. 12, but I prefer to use a single prism having parallel reflecting surfaces such as 45 and 46.

In Fig. 13, there is shown an embodiment of the invention in which the rotating arm 25 of Fig. 1 is replaced by a pendulum 186. It is not necessary to have complete rotation of the objective viewpoint, but obviously it is desirable to have this viewpoint follow an arcuate path such as that described by the rotating arm 25 or that described by the end of the pendulum 186 or at least to follow some repetitive path, to permit convenient arrangement of the light deviating means which must be coupled to the objective viewpoint changing apparatus and which must, when set for some particular reading, compensate exactly for the effect of the shift along the path.

As pointed out above, it is preferable to have the objective of the system held rigidly. A convenient arrangement for doing this is shown in Fig. 14. In this figure an eye-piece 190 is mounted in a support 191 and is slidable therein for adjustment to suit various observers. Light from the object whose range is to be found is transmitted by reflectors 192 and 193 through an objective 194 to form an image at the focus plane of the eye-piece 190. A wedge 195 is provided to control any movement of the image while the reflectors 192 and 193 are rotated about the optic axis of the system. This wedge 195 is adjustable longitudinally by a ring 196 engaging a ring 197 which may be moved by means of a link 198 and lever 199. A wing nut 200 is provided for holding the setting of this lever 199 and a scale 201 indicates the setting of the wedge 195, preferably in terms of the range being measured.

The objective 194 is rigidly supported in tube 205, but the reflectors 192 and 193 and the wedge 195 are rotatably supported in bearings 204, 205, and 206. The rotation is provided through gears 207 and 208 engaging long pinions 209, one of which is driven by a crank wheel 210. The gear 208 is rigidly attached to the tube 202 which carries the wedge 195 and as the wedge is adjusted the gear 208 slides longitudinally on the pinions 209. This arrangement is particularly stable since wobble between the gears has only a small angular effect at the centre of the large gear 208. A compensating wedge is not shown in this figure, but either the reflector 192 or the reflector 193 is made adjustable to provide the compensation necessary. In this Fig. 14, the reflectors 192 and 193 are formed in a Sprenger prism 211 so that one of the reflectors (192 in the figure) is a roof surface and the central rays follow the path shown by broken lines 212 and 213 suffering a reflection at the surface 214. This Sprenger prism inverts the image and renders unnecessary an erecting eyepiece. It may be used inverted and it may be substituted for the various forms shown in the other figures.

Fig. 15 shows a very compact arrangement and illustrates a practical method of permitting adjustment of the instrument in the field, i. e. while being used by the observer. In fact, in any of the previously described arrangements, the compensating wedge should preferably not be permanently fixed, but should be an adjustable wedge of any of the types described so that the instrument may be focused on an infinitely distant object or on one at a known range, and the scale and compensating wedge set so that the scale readings will be correct. In Fig. 15 light reaches an eye-piece 220 through an optical path which is folded back and forth. For convenience in showing, the optical path is drawn as an S shape, but obviously the device would be even more compact if one of the sections were not in the plane of the paper but above or below it so that the three paths form the edges of an equilateral prism. In that case of course, the mechanical details would differ somewhat from those shown, and the gears 225 and 228 would have to be offset. In Fig. 15 reflectors 222 and 223 are carried by the rotor 221 and are parallel to each other. Light from the reflector 223 passes through an objective 224 which is rigidly mounted on a support not shown. The rotor is driven by a gear 225 by means of a drive gear 226 and this gear 225 in turn drives the gears 227 and 228 to rotate the other portions of the optical system. After the light passes through the objective 224 it is reflected by prisms 229 through the remainder of the system to the eye-piece 220.

Any form of light deviating means may be provided, and in the arrangement shown, wedges 234 may be rotated equally in opposite directions by a gear 235. This gear 235 is driven by a pinion 233 engaging a rack 232 which is held by a spring 236 against the controlling member 230 which is adjustable by means of threads 231 and carries a scale which may be read against an index 219.

In each of the other arms of the system are respectively provided compensating wedges which are optically at right angles to each other to compensate for any lack of alignment in the system and to compensate for any setting of the wedges 234 at the infinity position of the scale. For simplicity of explanation, sliding single wedges are shown but other types may be used.

Since the means for adjusting the wedges 237 and 238 are similar, the arrangement thereof will be described only in connection with one of them. The wedge 237 is carried by a sliding sleeve 239 having a stud 241 rigidly fastened thereto and extending through a slot 240 in the rotating tube. This stud 241 rotates with the tube and slides in a ring recess 242 in a threaded sleeve 243 which engages the threads 244 fastened to the bearings. As the sleeve 243 is rotated, this ring recess 242 moves longitudinally on the tube carrying the wedge 237 with it, and providing the necessary adjustment for compensation. The wedge 238 is in the direction for compensating the residual power of the control wedges 234 at infinity setting. The wedge 238 has sufficient power to be adjustable in either direction (more deviation or less) from the theoretically exact power. If there were no balancing wedge acting in the opposite direction to wedge 237 the latter could be effective only in one direction from the optic axis and zero adjustment could never be achieved. To overcome this, one of the prisms 229 is tilted or an additional fixed wedge 245 is included.

Figs. 16 and 17 show a particularly practical arrangement of my invention. For convenience in showing, the objective 251 is mounted rotatable with the rotor 261 and the light deviating means consisting of rotating wedge 255 is shown some distance behind the objective 251. In practice, however, it is preferable to have these elements arranged as shown in Fig. 9 with the light deviating device in front of the objective and the objective mounted rigidly.

In this connection it is pointed out that the sliding wedge type of light deviating device as shown in Figs. 2 to 8 should be in the converging beam behind the objective, whereas the rotating type of wedge may be either place, but preferably in front of the objective. In Figs. 16 and 17 an eye-piece 250 is positioned to view the focus plane of the objective 251 mounted in the tube 261 to rotate in bearings 262 with the rotor 252 having a front window 254. A single prism of glass 253 comprises the outer and inner reflecting surfaces to receive light from the object whose range is to be found and to project it to the objective 251. The light deviating means consists of two wedges 255 carried on bevel rings 256. The bevel pinions engaging the bevel rings 256 are carried on pins 257 which in turn support bevel pinions 258 engaging a crown gear 259 mounted to rotate on the tube 261. There will be no relative rotation of the wedges 255 as long as the crown gear 259 rotates with the tube 261.

On the crown gear 259 is mounted a spur gear 260 and the tube 261 is similarly provided with a spur gear 263. These two spur gears 260 and 263 engage a differential gear made up of spur gears 270 and 272 respectively, an idler gear 271 being provided between the spur gear 263 and the spur gear 272 to permit rotation of the gears 270 and 272 in opposite directions while the gears 260 and 263 rotate in the same direction.

This spur gear 263 is also used for driving the rotor by meshing with the driving gear 264 which through bevel gears 265 and 266 is rotated by a crank wheel 267.

Thus the differential gear is driven by the rotation of the rotor. The spur gears 270 and 272, through convenient crown gears fastened thereto engage differential pinions 273 which are supported in a large ring gear 275 engaging a crown gear 276 mounted on a drum 277. As long as the drum 277 is held stationary, the ring gear 275 cannot rotate and the disk gears 272 and 270 must rotate in opposite directions with the same speed. This means that the gear 260 and the gear 263 rotate in the same direction with the same speed and hence there is no relative rotation of the prisms 255. However, if the drum 277 is rotated causing the ring gear 275 to rotate there is a difference in the rotation of the disk gears 272 and 270 which provides a relative rotation of the gear 260 and the gear 263. Through the pinions 258 and ring gears 256, this causes a relative rotation of the prisms 255 as required.

To provide the rotation of the drum 277 which carries a scale 278, there is provided an adjusting crank or handwheel 280 which for operation must be pressed in against a light spring pressure provided by a spring 281 until a gear 282 carried thereon engages a gear 283 mounted on the drum 277. Except when the handwheel 280 is pressed in, the gear 282 does not engage the gear 283. Hence, the drum 277 is free to rotate easily when the automatic adjustment, described below, is used. On the drum 277 there is also provided a large crown gear 284 which engages a pinion 285 coupled to a spur gear 292. When a spindle 286 is pulled out by a knob 287 a pinion 288 is brought into engagement with the spur gear 292. To insure accurate positioning of the spindle 286 ring notches 289 and 290 are provided into which a click latch 291 is pressed by suitable spring pressure. A key 294 and keyway 293 coupling is provided between the spur gear 272 and the spindle 286 so that the spindle rotates with this gear 272. When the spindle 286 is in the position shown, the rotation of the rotor by gear 263 and the accompanying rotation of the gear 272 causes rotation of the spindle 286 which has no useful effect. However, when the knob 287 and spindle 286 are pulled out so that the latch 291 drops into the ring notch 290 and the gear 288 engages the spur gear 292, the rotation of this spindle also drives the drum 277 slowly. This provides the cyclic range measurement, discussed above. An additional eyepiece 295 is provided for viewing the scale 278. By having the eye-pieces 250 and 295 spaced the interocular distance, the right eye may note the range as seen on the scale 278, when the left eye detects the cessation of image motion on the object whose range is being found. For those who normally use the right eye for aiming and sighting, this arrangement is particularly suitable, because the left eye is equally adept at detecting motion or the absence thereof, whereas the right eye is most useful for reading the scale 278. The housing 296 is provided for the whole instrument and is preferably easily removable for any adjustment that may be necessary.

Any suitable wedge means adjustably mounted in the optical path may be used for presetting the scale as described in detail above. For this compensation, I prefer to use rotating wedges 300 similar to wedges 255 which can only rotate equally in opposite directions. The compensating wedge 300 is positioned between the objective 251 and the rotating wedges 255 and has the same form as the wedges 255, and is adjustable only when the housing 296 is removed. In the arrangement shown, the wedges 300 are arranged so that their effective wedge action is in the opposite direction to the effective wedge action of the wedges 255 and all adjustment at right angles thereto is provided by adjusting the prism 253. Alternatively the wedges could be mounted to rotate also in the same direction or independently as described in Fig. 18 so that these wedges can correct for all types of errors. These wedges 300 are adjusted by pinions 301 and a crown gear 302 and when the crown gear is clamped in place by a clamp 303 they rotate with the tube 261.

Fig. 18 shows an embodiment of the invention in which the compensating wedges are adjustable in the field and are indepenently adjustable so that correction in any direction may be obtained. Most of the elements in this embodiment corresponding exactly to those shown in Fig. 16 and the same numbers have been used for corresponding parts. In order to get as much distance as possible between the lens, 306 in this case, and the focus plane, some of the parts are located slightly differently, but the correspondence between this figure and Fig. 16 is apparent as far as those elements having the same numbers are concerned.

The differences comprise the fact that a stationary tube 305 is used to support the lens 306 rigidly and both the measuring wedges 255 and the compensating wedges 307 are positioned in front of the lens 306. The compensating wedges 307 are mounted for independent rotation so that, within the range of deviating power available, this two-wedge combination may have any desired power and act in any desired direction. Since they are identically mounted, only one need be described. The wedge 307 is supported by a crown ring gear 308 which is rotated by a bevel pinion 309. The pivot for the pinion 309 extends through the rotating tube 261 and carries another pinion 310 on the outer end. This outer pinion 310 engages a crown gear 311 on the side of a ring spur gear 312 which is freely rotatable on the tube 261. A similar spur gear 313 having one tooth more or less than the spur gear 312 is rigidly attached to the tube 261 both by screws and by the bushing for the pivot supporting the pinions 309 and 310. A pinion 314 engages both spur gears 312 and 313 and is carried by a housing 315 which normally rotates with the rotating tube 261.

As long as this housing 315 rotates synchronously with the tube 261, the pinion 314 remains in engagement with the same tooth of the gear 313 and there is no relative rotation of the gears 312 and 313. However, by means of a brake 316 on which pressure may be applied through a finger key 317, the housing 315 may be stopped temporarily. This causes the pinion 314 to remain fixed in space and the rolling of the pinion on the gear 313 causes the gear 312 to rotate relatively thereto, and this causes rotation of the pinions 310 and 309. Thus while the rotor tube 261 is rotated by means of crank 267, the wedges 307 are adjusted simply by braking the housings 315 by finger pressure on the keys 317. It will be noted that the adjustment of the wedges 307 is very slow relative to the rotation of the tube 261 since it requires a complete revolution of the pinion 314 on the gear 313 to advance the gear 312 one tooth relative to the tube 261. Since the braking action always adjusts the wedges 307 in the same direction, it may be necessary to turn the crank 267 in the opposite direction if one wishes to return to a certain setting without turning the wedge 307 through 360 degrees. The keys 317 are purposely placed inside the housing 296 since it is not necessary to adjust these compensating wedges 307 except once in a long while. Since the wedges are independently adjustable it is possible to have any desired deviating power and to have the deviation in any desired radial direction. In practice brake controls are mounted convenient for the right hand but for clarity are shown on the left side of the instrument.

Figs. 19 and 20 show a simplified embodiment of the invention wherein a single element is used both as the objective and as the light deviating means. In these figures an eyepiece 320 receives light twice reflected in a prism 321 which rotates with a rotor and rotating tube 322. In the front end of this tube 322 is mounted a diaphragm 323 for the objective. The objective consists of a convex plano element, but could be more complicated with a plano spheric element as one of its components. For this embodiment, it is necessary that the optical system include a plano convex element, or a plano concave element, but this element need not be isolated as shown but may be either one component of a more complicated objective or may be combined with a neutralizing plano spheric element of equal but opposite power to give a variable wedge of known form.

In the embodiment shown the lens 324 is carried by a mount 325 having arms 326 extending backwards and pivoted to rotate about pivots 327. These pivots 327 are on a line perpendicular to the optic axis of the element at the center of curvature of its spheric surface, which is convex in the embodiment shown. The pivots 327 are supported by the tube 322 and extend through slots 328 in an inner sleeve 330 which carries studs 329. These studs 329 engage sloping surfaces of the arms 326 and sliding of the tube 330 inside the tube 322 causes the arms 326 to move up and down against the action of a spring 335. The tube 330 is held in place by a spring 331 and presses against ball-bearings 332 engaging a control member 333 which is screwed onto part of the frame 334. As the control member 333 is screwed down, the tube 330 moves forward inside the tube 322 causing the lens 324 to move downward against the pressure of the spring 335. This causes all light entering the front of the objective 324 to be bent downward since the rear surface of the element 324 acts as the rear surface of a prism, whereas the front surface has an unchanged effect on the incident beam. As pointed out above, this element 324 may be used isolated as shown or as one component of a more complex lens system. The only objection to this simplified system, is the difficulty of mounting the elements accurately and in a manner unaffected by vibration. However, these disadvantages are, for certain uses of the instrument, overcome by the simplicity of the arrangement.

Having thus described various embodiments of my invention, I wish to point out that it is not limited to these specific structures but is of the scope of the appended claims.

What I claim and desire to secure by Letters Patent of the United States is:

1. The method of range finding an object which comprises forming an image of the object by an objective, shifting the effective viewpoint of the objective along a repetitive path to shift said image relative to the optic axis of the objective without rotation of the image, arresting the motion of the image relative to the optic axis while continuing the shifting of the viewpoint, by adjusting an image motion eliminator and noting the adjustment.

2. A method according to claim 1 in which the shifting of the viewpoint is in an arcuate path giving an arcuate motion to the image.

3. A method according to claim 1 in which the shifting of the viewpoint is in a circular path giving a circular motion to the image.

4. A method of range finding an object which comprises forming an image of the object by an objective, shifting the effective viewpoint of the objective along a repetitive path to shift said image relative to the optic axis of the objective without rotation of the image, adjusting an image motion eliminator while continuing the shifting of the viewpoint and noting the adjustment when the motion of the image relative to the optic axis is arrested.

5. The method according to claim 4 in which the steps of adjusting and shifting of the viewpoint are coupled.

6. The method according to claim 4 in which the adjusting is cyclic and the steps of adjusting and shifting of the viewpoint are coupled whereby said adjustment for noting is repeated regularly.

7. A range finder comprising an objective for forming in a focus plane an image of the object whose range is to be found, means for shifting the effective viewpoint of the objective along an arcuate path while keeping the focus plane fixed, adjustable means coupled to said shifting means for controlling the movement of said image in the focus plane and means operated by the controlling means for indicating the range of the object when said controlling means is adjusted to the point at which said movement is zero.

8. A range finder comprising a support, an eyepiece carried by the support, an objective for forming in the focus plane of the eyepiece an image of the object whose range is to be found, a rotatable member mounted on the front of the support to rotate at least partially about a rotation axis which substantially coincides with at least part of the optic axis of the objective, two reflectors carried by the rotatable member approximately parallel to one another and positioned to receive light from the object on one of the reflectors which is an outer one, to one side of the rotation axis and to reflect it inward to the other reflector which is an inner one on the rotation axis and which reflects the light approximately along the rotation axis and to the focus plane, the objective being in the path of said light, and having a viewpoint which shifts as the rotatable member is rotated, adjustable control means operated in synchronism with the movement of the rotatable member for controlling the apparent amount of the corresponding movement of the image in the focus plane and scale means for indicating the adjustment of said control means when the image movement during the rotation of the rotatable member is reduced to zero.

9. A range finder according to claim 8 in which the objective is between the focus plane and the inner reflector.

10. A range finder according to claim 8 in which the objective is mounted to rotate with the rotatable member.

11. A range finder according to claim 8 in which the objective is between the focus plane and the inner reflector and there is included means for holding the objective rigid while the rotatable member is rotating.

12. A range finder according to claim 8 in which the two reflectors are formed in a single prism, having an entrance and exit surfaces substantially normal to the light beam therethrough.

13. A range finder according to claim 8 in which adjustable means are mounted in the light path rotatable with the rotating member for presetting the scale means.

14. A range finder according to claim 8 in which adjustable means are mounted in the light path rotatable with the reflectors for eliminating all image movement of infinitely distant objects during viewpoint shift when the scale means is set at infinity.

15. A range finder according to claim 8 in which the control means is a wedge adjustably mounted in the light path rotatable with the reflectors.

16. A range finder comprising a support, an eyepiece carried on one end of the support, a pendulum pivoted at the other end of the support, a reflector carried at the lower end of the pendulum to receive light from the object whose range is to be found and to reflect it along the pendulum; an inner reflector carried by the pendulum at its pivot to receive the reflected light and again to reflect it along the axis of rotation of the pendulum to the eyepiece, an objective positioned in the path of said light for focusing in the focus plane of the eyepiece an image of said object, variable light deviating means carried by the pendulum also in said path for controlling the amount of the image movement during swinging of the pendulum, means carried by the support for adjusting the light deviating means and scale means coupled to the adjusting means for indicating the object range when said movement is reduced to zero.

17. A range finder comprising a support, an eyepiece carried by the support, a rotor rotatably mounted on the front of the support, a reflecting surface carried near the rim of the rotor to receive light from the object whose range is to be found and to reflect it toward the axis of rotation of the rotor, an inner reflecting surface carried by the rotor on its axis to receive the reflected light and again to reflect it along the axis, the eyepiece being positioned to receive the light, an objective in the path of said light for focusing in the image plane of the eyepiece an image of said object, means rotatable with the rotor and also in said path for controlling the amount of image movement during rotor rotation, means on the support for adjusting the control means, and scale means coupled to the adjusting means for indicating the adjustment when said image movement is zero.

18. A range finder according to claim 17 in which the control means is a wedge system for deflecting said image laterally, which wedge system is adjustable to vary the amount of the deflection.

19. A range finder according to claim 17 in which the objective is rigidly supported by the support.

20. A range finder according to claim 17 in which the objective is between the focus plane and the control means which is a variable power optical wedge system positioned to receive the light reflected from the inner reflector.

21. A range finder according to claim 17 in which the control means consists of a variable deviating power wedge system carried by the rotor between the inner reflector and the focus plane and mounted with its effective apex perpendicular to the plane containing the rotation axis and the optic axis between the two reflectors.

22. A range finder according to claim 17 in which the control means consists of two substantially identical wedges rotated with the rotor and mounted for adjustment by relative rotation equally in opposite directions from the effective apex of the two wedge combination which effective apex is maintained perpendicular to the plane containing the rotation axis and the optic axis between the two reflectors.

23. A range finder according to claim 17 in which the control means consists of a variable power light deviating means including a plano spheric lens element mounted rotatable about a line through the center of curvature of its spheric surface.

24. A range finder comprising a support, an eyepiece carried by the support, a rotor rotatably mounted on the front of the support, a reflecting surface carried near the rim of the rotor to receive light from the object whose range is to be found and to reflect it toward the axis of rotation of the rotor, an inner reflecting surface carried by the rotor on its axis to receive the reflected light, and again to reflect it along the axis, an objective rigidly supported by the support to receive the multiply reflected light and to focus in the focus plane of the eyepiece an image of said object, two wedges mounted rotatable with the rotor in front of the objective with the effective apex of the two wedge combination perpendicular to the plane containing the axis of rotation and the optic axis between the reflectors, adjusting means on the support for rotating the two wedges laterally and equally in opposite directions to vary their total light deviating power and to control the amount of image movement during rotation, scale means for indicating the adjustment in terms of object range when said image movement is reduced to zero and additional compensating wedge means in the light path.

25. A range finder according to claim 24 in which the additional wedge means has the power which cancels all deviation between the light from the object and the light through the objective when the two-wedge combination is set for maximum deflection to one side of the axis, said one side being the one on which lies the rim reflector, whereby this setting of the wedge combination corresponds to infinity range.

26. A range finder according to claim 24 in which the additional wedge means is adjustable for presetting the scale means.

27. A range finder according to claim 24 in which the additional wedge means is adjustable and means are carried on the support for adjusting this wedge means while the rotor is rotating.

28. A range finder according to claim 24 in which the additional wedge means has the power which cancels all deviation between the light from the object and the light through the objective when the two wedge combination is set for maximum deflection to one side of the axis, said one side being the one on which lies the rim reflector and in which the scale means includes a completely circular scale with the infinity point and the near point at opposite ends of a diameter about which the sides of the scale are symmetrical.

29. A range finder according to claim 24 in which there is included means for adjusting the wedge means synchronously with and slowly relative to the rotation of the rotor.

30. A range finder according to claim 24 in which the adjusting means for rotating the wedges and controlling the image movement consists of a member concentric with the rotor for rotating the wedges in proportion to the relative rotation of the rotor and concentric member, a differential gear with opposite sides geared respectively to the rotor and the concentric member to rotate equally in opposite directions when the rotor and concentric member rotate synchronously, a rotatable support for the end gears of the differential and means for rotating the rotatable support to give relative rotation of the rotor and the concentric member, the scale means being coupled to the last mentioned rotating means.

31. A range finder comprising a support, an eyepiece carried by the support, a rotor rotatably mounted on the front of the support, a reflecting surface carried near the rim of the rotor to receive light from the object whose range is to be found and to reflect it toward the axis of rotation of the rotor, an inner reflecting surface carried by the rotor on its axis to receive the reflected light, and again to reflect it along the axis, an objective carried by the rotor to focus in the focus plane of the eyepiece an image of said object, the objective including a plano spheric lens element pivoted on the rotor to rotate slightly about a line through the centre of curvature of its spheric surface and perpendicular to the plane containing the rotation axis and the optic axis between the reflectors, adjusting means on the support for moving the lens element about said line and scale means for indicating the adjustment of the lens element when the image movement during rotor rotation is reduced to zero.

BENJAMIN E. LUBOSHEZ.